United States Patent
Woo

(10) Patent No.: US 10,345,166 B2
(45) Date of Patent: Jul. 9, 2019

(54) TORQUE ANGLE SENSOR MODULE AND APPARATUS FOR SENSING STEERING ANGLE OF VEHICLE USING THE SAME

(71) Applicant: LG Innotek Co., Ltd., Seoul (KR)

(72) Inventor: Myung Chul Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/541,348

(22) PCT Filed: Dec. 22, 2015

(86) PCT No.: PCT/KR2015/014081
§ 371 (c)(1),
(2) Date: Jun. 30, 2017

(87) PCT Pub. No.: WO2016/108492
PCT Pub. Date: Jul. 7, 2016

(65) Prior Publication Data
US 2017/0350776 A1    Dec. 7, 2017

(30) Foreign Application Priority Data
Dec. 30, 2014 (KR) .................. 10-2014-0194400

(51) Int. Cl.
*G01L 3/10* (2006.01)
*B62D 5/04* (2006.01)
(Continued)

(52) U.S. Cl.
CPC .............. *G01L 3/10* (2013.01); *B62D 5/0463* (2013.01); *B62D 6/10* (2013.01); *B62D 15/021* (2013.01);
(Continued)

(58) Field of Classification Search
CPC ...... B62D 5/0463; B62D 6/10; B62D 15/021; B62D 15/0215; G01L 3/10
See application file for complete search history.

(56) References Cited

U.S. PATENT DOCUMENTS 5,197,338 A * 3/1993 Heiman ................ F16K 31/045
                                                                    73/168
7,663,274 B2 * 2/2010 Kataoka ................ H02K 3/522
                                                                    310/68 R
(Continued)

FOREIGN PATENT DOCUMENTS

CN    101708736 A    5/2010
CN    101854097 A    10/2010
(Continued)

OTHER PUBLICATIONS

International Search Report in International Application No. PCT/KR2015/014081, filed Dec. 22, 2015.
(Continued)

*Primary Examiner* — Behrang Badii
*Assistant Examiner* — Daniel L Greene
(74) *Attorney, Agent, or Firm* — Saliwanchik, Lloyd & Eisenschenk

(57) ABSTRACT

Disclosed are structures of a torque sensor and of an angle sensor for a vehicular steering angle sensing devise. An embodiment of the present invention provides a torque sensor module comprising: a rotor holder, which has a hollow interior; a yoke member coupled along the outer peripheral surface of the rotor holder; and a first magnet coupled so as to contact the outer peripheral surface of the yoke member, wherein the torque sensor module comprises a supporting/coupling portion, which extends from the upper
(Continued)

surface of the rotor holder, and which contacts the upper surfaces of the yoke member and of the first magnet, respectively.

20 Claims, 7 Drawing Sheets

(51) Int. Cl.
    *B62D 6/10*     (2006.01)
    *B62D 15/02*     (2006.01)
    *G01L 3/04*     (2006.01)

(52) U.S. Cl.
    CPC ............ *B62D 15/0215* (2013.01); *G01L 3/04* (2013.01); *G01L 3/101* (2013.01)

(56) References Cited

U.S. PATENT DOCUMENTS

| | | | | |
|---|---|---|---|---|
| 8,584,532 | B2* | 11/2013 | Lee | G01L 25/003 73/862.191 |
| 2002/0047460 | A1* | 4/2002 | Yoneda | B62D 5/043 310/216.112 |
| 2008/0251311 | A1* | 10/2008 | Waibel | B62D 5/008 180/443 |
| 2010/0244606 | A1* | 9/2010 | Kim | H02K 15/03 310/156.13 |
| 2011/0035114 | A1* | 2/2011 | Yoneda | B62D 5/046 701/42 |
| 2013/0195697 | A1* | 8/2013 | Kim | F04C 2/18 417/410.4 |
| 2015/0353128 | A1* | 12/2015 | Shibuya | B60W 10/02 701/41 |

FOREIGN PATENT DOCUMENTS

| | | |
|---|---|---|
| CN | 102891584 A | 1/2013 |
| DE | 10 2013 006 567 A1 | 10/2014 |
| EP | 2 600 129 A2 | 6/2013 |
| JP | 03-018264 A | 1/1991 |
| KR | 10-1034113 B1 | 5/2011 |
| KR | 10-2011-0088784 A | 8/2011 |
| KR | 10-1128608 B1 | 3/2012 |
| KR | 10-2013-0011661 A | 1/2013 |
| KR | 10-1279774 B1 | 7/2013 |
| WO | WO-2011/069464 A1 | 6/2011 |

OTHER PUBLICATIONS

Supplementary European Search Report dated Oct. 15, 2018 in European Application No. 15875586.8.

Chinese Office Action dated Jan. 28, 2019 in Chinese Application No. 201580071928.1.

\* cited by examiner

FIG 2.
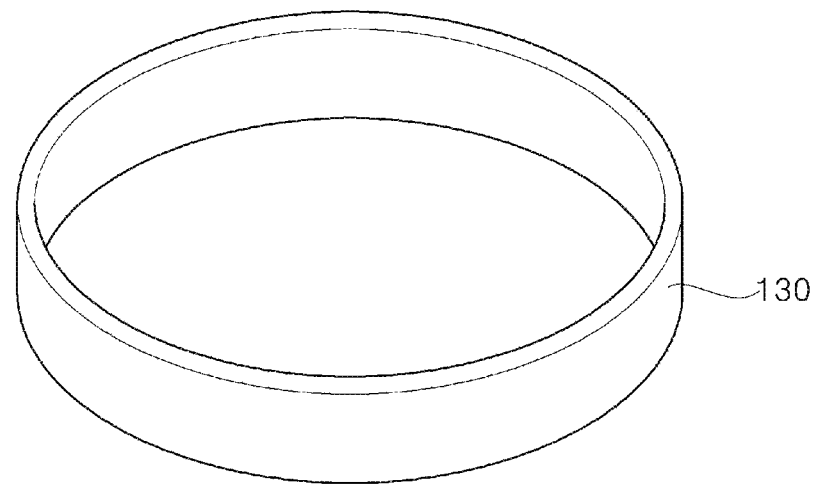
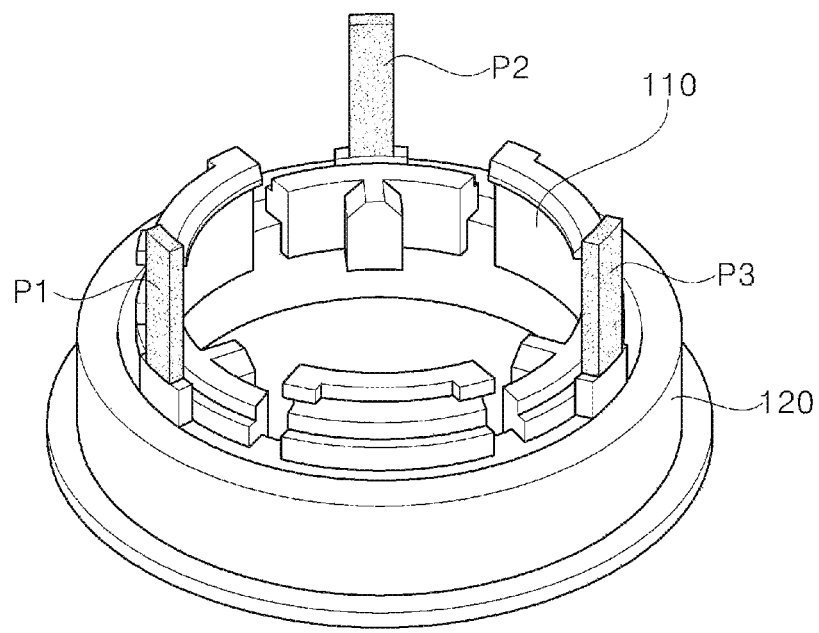

TORQUE ANGLE SENSOR MODULE AND APPARATUS FOR SENSING STEERING ANGLE OF VEHICLE USING THE SAME

CROSS-REFERENCE TO RELATED APPLICATIONS

This application is the U.S. national stage application of International Patent Application No. PCT/KR2015/014081, filed Dec. 22, 2015, which claims priority to Korean Application No. 10-2014-0194400, filed Dec. 30, 2014, the disclosures of each of which are incorporated herein by reference in their entirety.

TECHNICAL FIELD

The teachings in accordance with the exemplary embodiments of this present disclosure generally relate to a torque sensor for apparatus for sensing steering angle of vehicle and structure for angle sensor.

DISCUSSION OF THE RELATED ART

Generally, almost every vehicle employs an electric power-assist steering system. Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The torque sensor in the EPS is configured such that a magnet is arranged along a periphery of a rotor, and a stator formed with a lug piece corresponding to a polarity of the magnet is arranged at a periphery thereof, where magnetic charge is outputted in response to a difference of mutual rotations to detect torques of input shaft and output shaft, and the torques are transmitted to an ECU. In addition, a torque angle sensor detects a torque applied to a steering shaft, outputs an electric signal proportional to the detected torque, and outputs an electric signal proportional to a rotation angle of the steering shaft.

In this configuration, a yoke member for efficiently increasing and controlling the magnetic force is inserted between magnets arranged at the periphery of a rotor, where the magnets and the yoke member are coupled using an adhesive to form a single module. However, the coupled structure using the adhesive disadvantageously generates a problem that brings about detachment of magnets due to adhesive defects.

DETAILED DESCRIPTION OF INVENTION

Technical Subject

The present disclosure is directed to cope with the above-mentioned problems/disadvantages, and particularly, the present disclosure can provide a torque sensor module configured to solve detachment fault of magnets due to adhesive alteration and omission and to enhance the performance of torque sensor by using a support coupling part free from use of adhesive for coupling of a yoke member coupled to a rotor holder and magnets and by coupling the yoke member and the magnets at an upper side.

Technical Solution

In one general aspect of the present disclosure, there is provided a torque sensor module, the torque sensor module comprising:
a center-hollowed rotor holder;
a yoke member coupled to a periphery of the rotor holder;
a first magnet coupled to a periphery of the yoke member by being contacted thereto; and
a support coupling part extended from an upper surface of the rotor holder to contact an upper surface of the yoke member and the first magnet.

Preferably, but not necessarily, the support coupling part may include two or more unit support coupling parts each protruded to an outside direction along a periphery of an upper surface at the rotor holder, and each spaced apart from the other.

Preferably, but not necessarily, the support coupling part may be provided with a ring shape protruded to an outside direction along a periphery of an upper surface at the rotor holder.

Preferably, but not necessarily, the support coupling part may be formed with a protruding width less than a sum of a thickness of the yoke member and a thickness of the first magnet.

Preferably, but not necessarily, the support coupling part may have a no-adhesive coupling structure, where a periphery of the yoke member and an inner circumferential surface of the first magnet are directly brought into contact.

Preferably, but not necessarily, the rotor holder may include an upper support part extensively protruded from an upper end of a body at the rotor holder to an outside, a lower support part extensively protruded from a lower end of a body at the rotor holder to an outside.

Preferably, but not necessarily, a diameter of the body may be smaller than that of the upper support part or the lower support part.

Preferably, but not necessarily, the support coupling part may have a no-adhesive coupling structure, where the periphery of the yoke member and the inner circumferential surface of the first magnet are directly brought into contact.

Preferably, but not necessarily, the support coupling part may have a same material as that of the rotor holder.

Preferably, but not necessarily, each of the unit support coupling parts may be arranged at a same interval based on a center between the support coupling part and the rotor holder.

In another general aspect of the present disclosure, there is provided an apparatus for sensing a steering angle of a vehicle, the apparatus comprising:
a rotor coupled to a yoke member and a first magnet at a periphery of a rotor holder connected to an input shaft through a hollow hole;
a stator discretely arranged at a periphery of the rotor and connected to an output shaft; and
a gear module including a main gear coupled to a lower side of the stator to rotate along with the stator, and an a plurality of sub gears that interacts with the main gear and includes a second magnet and a third magnet, wherein the apparatus further comprises a support coupling part extended from an upper surface of the rotor holder to contact an upper surface of the yoke member and the first magnet.

Preferably, but not necessarily, the apparatus may have a no-adhesive coupling structure, where a periphery of the yoke member and an inner circumferential surface of the first magnet are directly brought into contact.

Preferably, but not necessarily, the support coupling part may be extended from a periphery of the rotor holder with a length more than a length of a border of contact coupling portion between the yoke member and the first magnet.

Preferably, but not necessarily, the plurality of sub gears may include a first sub gear and a second sub gear each meshed to a set of teeth of main gear, and a rotation center of the first sub gear and a rotation center of the second sub gear are respectively arranged with the second magnet and the third magnet.

Preferably, but not necessarily, the apparatus may further comprise a first magnet sensor arranged on a PCB opposite to the second magnet.

Advantageous Effects of the Disclosure

The present disclosure has an advantageous effect in that coupling between a yoke member coupled to a rotor holder and magnets is coupled at an upper side using a support coupling part free from an adhesive to prevent the adhesive from being altered and omitted whereby detachment of magnet can be solved and performance of torque sensor can be enhanced.

In addition, there is another advantageous effect in that, when a support coupling part is formed by fusing a portion extended from a rotor holder, and an upper surface of a border coupled part between a yoke member and a magnet is covered, the efficiency of manufacturing process and the binding property can be further enhanced as well.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings:

FIGS. 1, 2 and 3 are schematic views illustrating a structure of a torque sensor module according to an exemplary embodiment of the present disclosure, wherein FIG. 1 is a conceptual view illustrating a yoke member and a rotor holder being separated, and FIGS. 2 and 3 are conceptual views illustrating a magnet member being coupled to a rotor holder coupled by a yoke member;

BEST MODE

Figure 1:
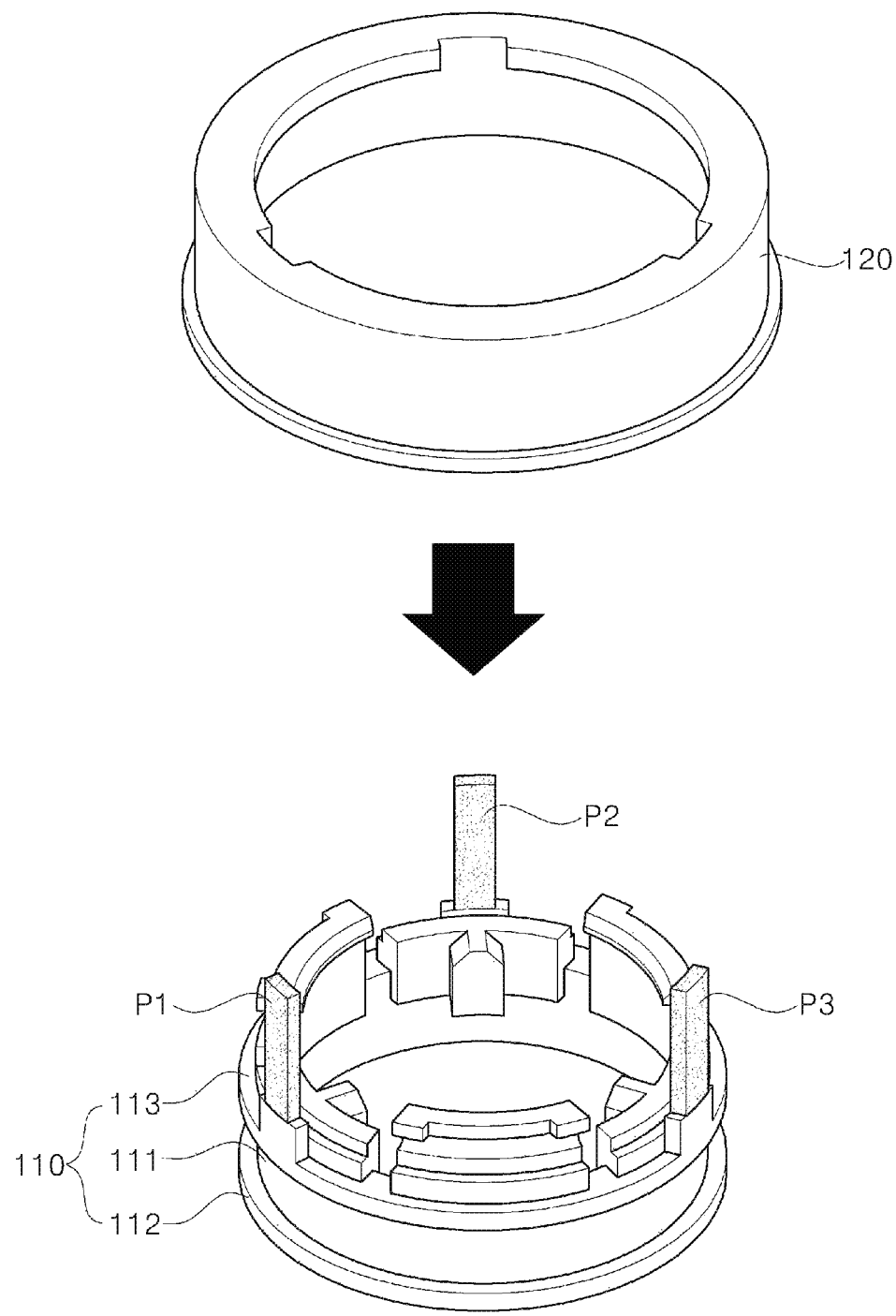

Structures and operations of the present disclosure will be explained in detail with reference to the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc., of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

Figure 3:
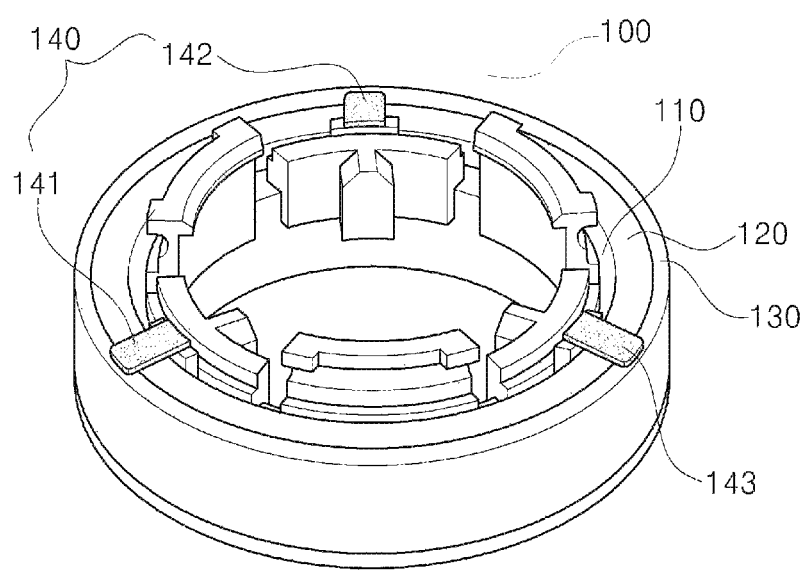

FIGS. 1, 2 and 3 are schematic views illustrating a structure of a torque sensor module according to an exemplary embodiment of the present disclosure, wherein FIG. 1 is a conceptual view illustrating a yoke member and a rotor holder being separated, and FIGS. 2 and 3 are conceptual views illustrating a magnet member being coupled to a rotor holder coupled by a yoke member.

Referring to FIG. 3, a torque sensor module according to an exemplary embodiment of the present disclosure may include a center-hollowed rotor holder (110), a yoke member (120) coupled to a periphery of the rotor holder (110), a first magnet (130) coupled to a periphery of the yoke member (120) by being contacted thereto, and a support coupling part (140) extended from an upper surface of the rotor holder (110) to contact an upper surface of the yoke member and the first magnet.

The rotor holder (110), as illustrated in FIG. 3, may have a cylindrical shape of structure in which a center thereof is hollowed, and a periphery has a predetermined width. In this case, the rotor holder (110) may be formed by a structure including a body (111), which is a peripheral surface, an upper support part (112) bent from an upper end of the body (111) to an outside direction, and a lower support part (113) protrusively bent from a lower end to an outside direction.

Referring to FIGS. 1 and 2, the upper and lower support parts (112, 113) may be supported by allowing the yoke member (120) to be tightly coupled to a periphery of the body (111), and may realize a stable support (bearing) power in order to prevent upper/lower parts from being detached. In addition, the inside hollow part of the rotor holder (110) may rotate by being connected to an input shaft (described later, see FIG. 6). In this case, the upper and lower support parts (112, 113) may be structured in such a fashion that each width (diameter) of the upper and lower support parts (112, 113) is greater than that of the body (111), and this structure has an advantageous effect of providing an accommodation area of a magnet for more efficient rotational motion.

The yoke member (120) may be generally realized by a ring-shaped structure to allow being tightly attached to a periphery of the body (111) at the rotor holder (110), and a manufacturing process thereof may be realized by insert injection process.

Furthermore, as illustrated in FIGS. 1 and 2, protruding structures (P1, P2, P3) are provided in order to form a support coupling part on an upper surface of a periphery at the rotor holder (110) before realizing a structure of FIG. 3, which is a final coupled structure. The protruding structures (P1, P2, P3) may be formed in advance in the injection molding process when the rotor holder (110) is manufactured, or may be realized using a separate member. In case of prior formation in the injection molding process, the rotor holder (110) and the protruding structures may be formed with the same material. This way provides an advantage in that fusion characteristics are enhanced to enable a more stable coupling. In addition, the protruding structures may be arranged about a center of the rotor holder each at an equal gap in consideration of characteristic of rotating motor. For example, as illustrated in FIG. 1, each protruding structure may be divisibly arranged at a 120° equal gap about the rotor holder, whereby advantage can be embodied of realizing a stable support power due to even distribution of areas supported by a fusion part.

The protruding structures (P1, P2, P3) may be embodied by a structure of support coupling parts (141, 142) configured to strongly couple the yoke member and the first magnet from an upper side, as illustrated in FIG. 3, through a fusion process, subsequent to the yoke member (120) and the first magnet (130) are coupled.

Figure 4:
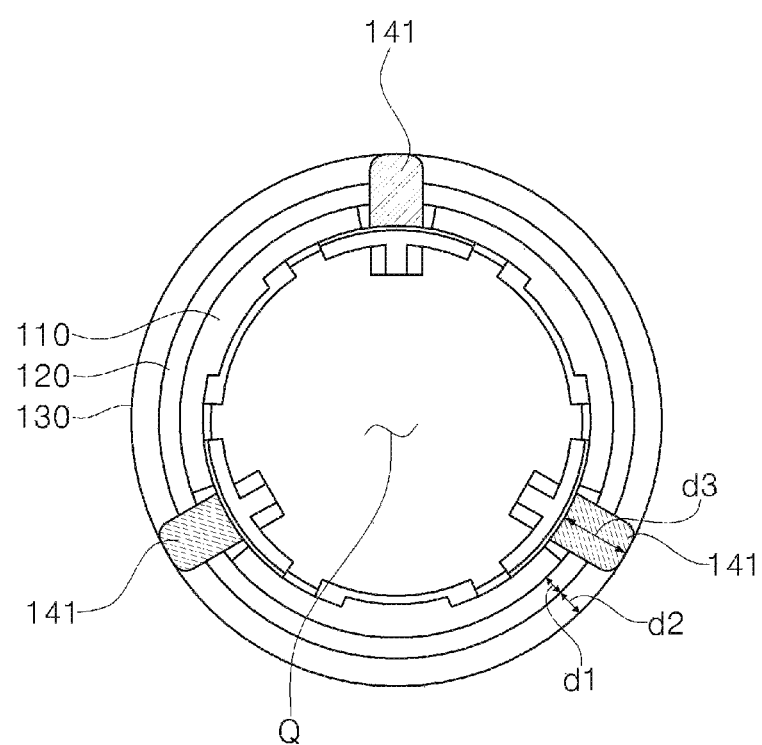
FIGS. 4 and 5 are schematic views illustrating formation of support coupling part in a torque sensor module according to an exemplary embodiment of the present disclosure illustrated in FIG. 3.
Figure 5:
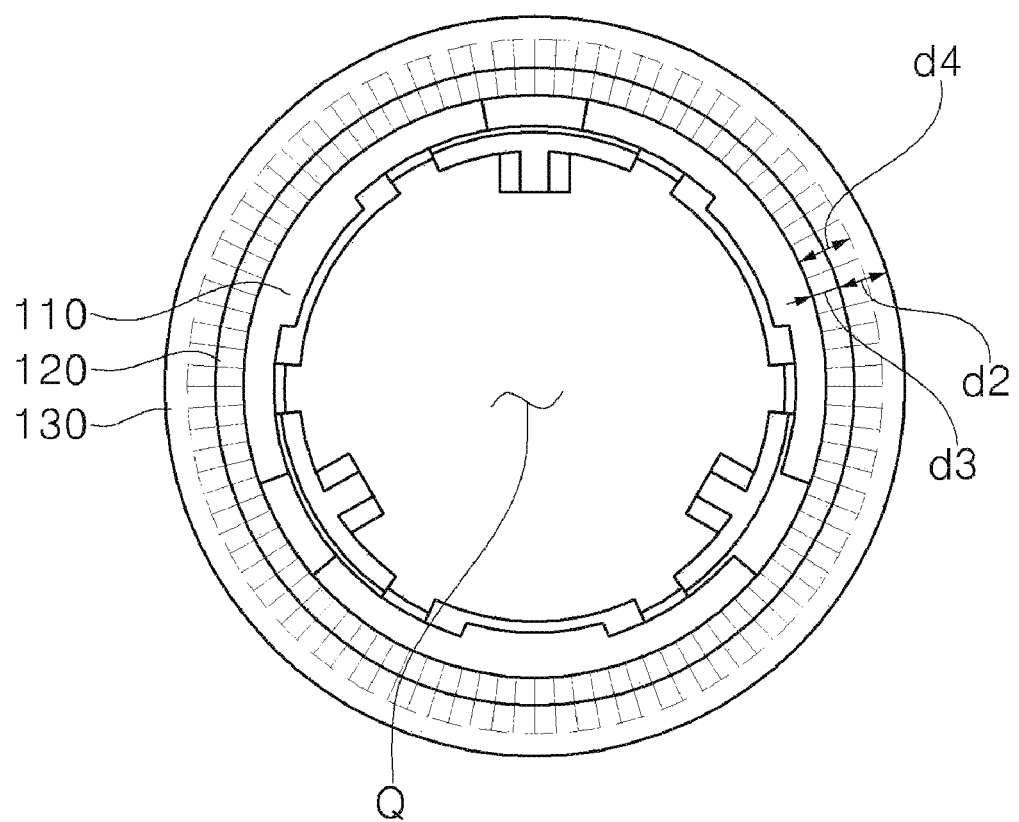

FIGS. 4 and 5 are schematic views illustrating formation of support coupling part in a torque sensor module according to an exemplary embodiment of the present disclosure of FIG. 3.

Referring to FIGS. 3 and 4, the support coupling parts (141, 142, 143) in the torque sensor module according to an exemplary embodiment of the present disclosure may be realized by a structure including two or more unit support coupling parts ((141, 142, 143), each spaced apart, and each protruding to outside direction by being extensively formed from a periphery of an upper surface of the rotor holder (110). Of course, although the unit support coupling part may be in the number of one (1), it would be more preferable and efficient that the support coupling parts are formed with two or more unit support coupling parts in order to realize a stable structure.

Furthermore, a periphery of the yoke member (120) and an inner circumferential surface of the first magnet (130) may contact each other by an adhesive-free structure (hereinafter referred to as "non-adhesion coupling structure") according to an exemplary embodiment of the present disclosure, and, despite the non-adhesion coupling structure, a stable coupling power can be formed to upper/lower directions due to abovementioned structure of support coupling parts.

In addition, the support coupling part can demonstrate a more stable effect in that a coupling power can be improved by forming in such a manner that the support coupling part can cover an upper surface of a border directly contacted by a periphery of the yoke member and an inner circumferential surface of the first magnet. Toward this end, the unit support coupling parts ((141, 142, 143) may have a protruding width (d3) less than a sum (d1+d2) of thickness of the yoke member (120) and thickness of the first magnet (130). That is, it is preferable that a length of the unit support coupling parts ((141, 142, 143) strengthen the coupling power by allowing a length (d3) extended from a periphery of the rotor holder (110) to be extended to a point beyond a border between the yoke member (120) and the first magnet (130).

Another realizing exemplary embodiment of the support coupling part may be realized by a structure as illustrated in FIG. 5. That is, not the structure realized in a plurality of support coupling parts each space apart as in FIG. 4, but it may be also realized by a ring shaped structure protruded to an outside direction along a periphery of the rotor holder (110). Of course, even in this case, the coupling power can be strengthened by allowing a length (d3) extended from a periphery of the rotor holder (110) to be extended to a point beyond a border between the yoke member (120) and the first magnet (130), which is as explained above.

The torque angle sensor module according to an exemplary embodiment of the present disclosure thus elaborated can realize an advantage of solving adhesive alteration and detachment or omission of magnet by coupling the support coupling part at an upper side using no adhesive for coupling between a yoke member coupled to a rotor holder and a magnet, whereby a more reliable apparatus for sensing steering angle can be realized.

Figure 6:
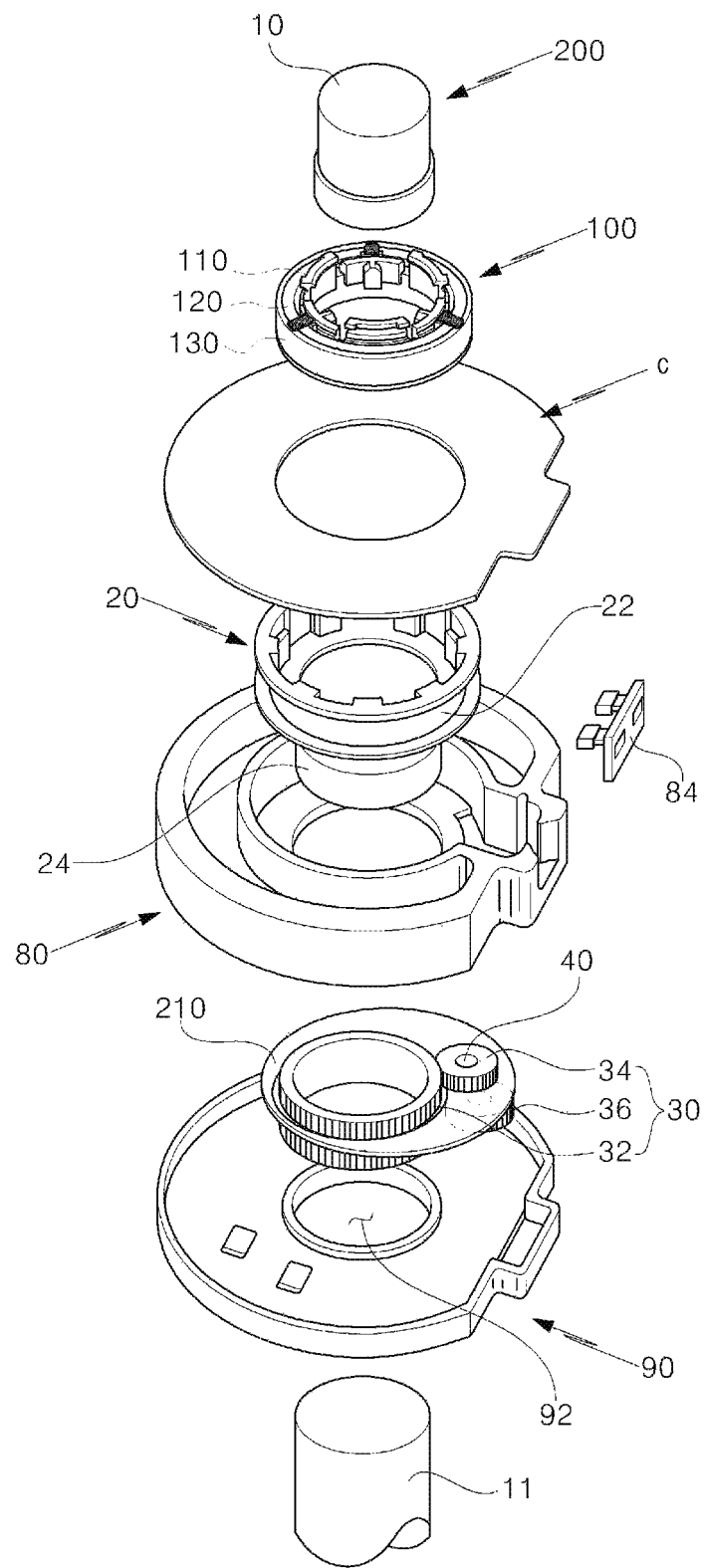
FIG. 6 is a conceptive separation view according to an exemplary embodiment of an apparatus for sensing a steering angle of vehicle employing a support coupling part in a torque sensor module according to an exemplary embodiment of the present disclosure illustrated in FIG. 3.

FIG. 6 is a conceptive separation view according to an exemplary embodiment of an apparatus for sensing a steering angle of vehicle employing a support coupling part in a torque sensor module according to an exemplary embodiment of the present disclosure illustrated in FIG. 3.

Hereinafter, a structure of an apparatus for sensing steering angle of vehicle that is applied with a torque angle sensor module according an exemplary embodiment of the present disclosure will be described.

Referring to FIG. 6, an apparatus for sensing steering angle of vehicle according an exemplary embodiment of the present disclosure (200, hereinafter referred to simply as "apparatus") may include a yoke member (120) formed at a periphery of a rotor holder (110) connected to an input shaft (10) through a hollow hole, and a rotor (100) coupled by a first magnet. It should be apparent that the above structure described in the torque angle sensor module in FIGS. 1 to 5 can be applied as it is to the rotor (100).

In addition, the apparatus (200) may further include a stator (20) discretely arranged from a periphery of the rotor (100) to be connected to an output shaft (11), a main gear (32) coupled to a lower side of the stator (20) to rotate along with the stator (20), and a gear module (30) interacting with the main gear (32) and to include a plurality of sub gears (34, 36) including a second magnet (40) and a third magnet (50).

In this case, the rotor (100) and the stator (20) may form the torque sensor module. To be more specific, the torque sensor module is such that a first magnet (130) is arranged along a periphery of the rotor (100), and a stator (20) formed with a protruding piece corresponding to a polarity of a magnet is arranged at a periphery to detect a magnetic charge in response to a mutual rotation and to detect a torque of the input shaft (10) and the output shaft (11), which is then transmitted to an electronic control device. In this case, the rotor (100), in particular, as illustrated in FIGS. 1-5, is extended from an upper surface of the rotor holder and is allowed to realize a coupling structure using no adhesive through a support coupling part contacting an upper surface of the yoke member and the first magnet, and to thereby provide an apparatus performing a stable function.

Furthermore, like the structure illustrated in FIG. 6, an inner lateral surface of the ring-shaped first magnet (130) included in the rotor (100) according to an exemplary embodiment of the present disclosure may be coupled by an input shaft (10).

The input shaft (10) may rotate in association with the first magnet (130), when the input shaft (10) is connected to a steering wheel (not shown) of a vehicle and a driver rotates the steering wheel by manipulating the steering wheel. The first magnet (130) may be coupled to a periphery of the input shaft (10) by the rotor holder (110). In this case, the aforementioned yoke member may be further included. Furthermore, the input shaft (10) may be realized by a structure of including a cover (C) at an upper surface side of the apparatus, a first case (80) at a lower surface side and a second case (90) to accommodate a stator and an angle sensor module.

The stator (20) may be respectively installed at an upper end of a stator holder (22) and at a lower end facing the upper end. For example, the stator (20) may take a cylindrical shape or the stator (20) may take a ring shape, for example. Furthermore, a coupling part (24) may be protrusively formed from a lower end of the stator (20). The coupling part (24) may take a cylindrical shape and may be coupled by an output shaft (11), for example.

In this case, the output shaft (11) may be connected to a front wheel of a vehicle contacting a road, and the output shaft (11) and the input shaft (10) may be connected by a torsion bar (not shown), whereby, when a driver rotates a steering wheel, the torsion bar connecting the output shaft (11) and the input shaft (10) may be generated with a twist torque by a frictional resistance with the road and the front wheel. When the twist torque is generated on the torsion bar, a rotational angle of the first magnet (130) connected to the input shaft (10) and a rotational angle of the stator (20) connected to the output shaft (11) may become mutually different due to twist torque, and as a result, the stator (20) and the first magnet (130) may perform a relative motion.

In this case, when the rotational angle of the stator (20) and the rotational angle of the first magnet (130) are mutually different, a magnetic field is generated between the first magnet (130) and the stator (20) due to a difference of rotational angle between the first magnet (130) and the stator (20). The magnetic field generated between the first magnet (130) and the stator (20) may be detected by a magnetic field sensor (84), and the intensity of magnetic field detected by the magnetic field sensor (84) may be transmitted to an ECU (Electronic Control Unit). In this case, the ECU may compare the intensity of a preset reference magnetic field and an intensity of magnetic field received form the magnetic field sensor (84) to calculate a steering torque, and a user may generate an auxiliary manipulation force necessary for manipulating the steering wheel from the EPS (Electric Power Steering) motor based on the calculated steering torque.

In the structure illustrated in FIG. 6, the first case (80) may accommodate the stator (20). The first case (80) may be structured in such a manner that an upper end is opened to accommodate the stator (20), and a through hole (82) is formed that is adequate to allow the coupling part (24) protruded from the stator (20) to pass through the through hole (82).

The angle sensor module interacting with the torque sensor module will be described with reference to FIG. 6. The angle sensor module may generally be such that the main gear (32) attached to a steering shaft is rotated by being interacted in response to rotation of the steering wheel by the driver to generate a difference in rotational angle, where a Hall IC recognizes the magnetic field of magnets (40, 50) attached to sub gears (34, 36) attached to the main gear (32) and the rotational direction and transmits a signal to the ECU.

To be more specific, the gear module (30), the second magnet (40) and the third magnet (50, see FIG. 7) at the apparatus according to the exemplary embodiment of the present disclosure can sense a steering angle of the steering wheel manipulated by a driver. Thus, the gear module (30) may be formed by including a main gear (32), a first sub gear (34) and a second sub gear (36).

In this case, the main gear (32) may be inserted into a periphery of the coupling part (24) protruded from the stator (20), and the periphery of the main gear (32) may be formed with a set of teeth. The main gear (32) may be rotated in association with the rotation of the output shaft (11), because the main gear (32) is coupled to the coupling part (24) and the coupling part (24) is coupled to the output shaft (11).

In addition, in order to prevent the main gear (32) from slipping from a periphery of the coupling part (24), the main gear (32) and the coupling part (24) may be respectively formed with a hitching lug (not shown) or a hitching groove (not shown) coupled with the hitching lug. The first sub gear (34) included in the gear module, for example, may have a structure of having a disk shape and formed with a set of teeth at a periphery of the first sub gear (34).

In this case, the first sub gear (34) may directly be meshed with the set of teeth of the main gear (32), and the first sub gear (34) and the main gear (32) may be arranged in parallel. The first sub gear (34) and the main gear (32) may have a first gear ratio, for example. Furthermore, the second sub gear (36) may have a disk shape, for example, and a periphery of the second sub gear (36) may be formed with a set of teeth, and the second sub gear (36) may be directly meshed with the set of teeth of the main gear (32), like the first sub gear (34), and the second sub gear (36) and the main gear (32) may have a second gear ratio, for example.

That is, the first sub gear (34) and the second sub gear (36) in the structure of main gear may respectively and directly be meshed with the main gear (32). When the first sub gear (34) and the second sub gear (36) are respectively and directly be meshed with the main gear (32), a backlash can be greatly reduced over a case where the main gear (32) is directly meshed with the first sub gear (34) and when the first sub gear (34) is directly meshed with the second sub gear (36).

Figure 7:
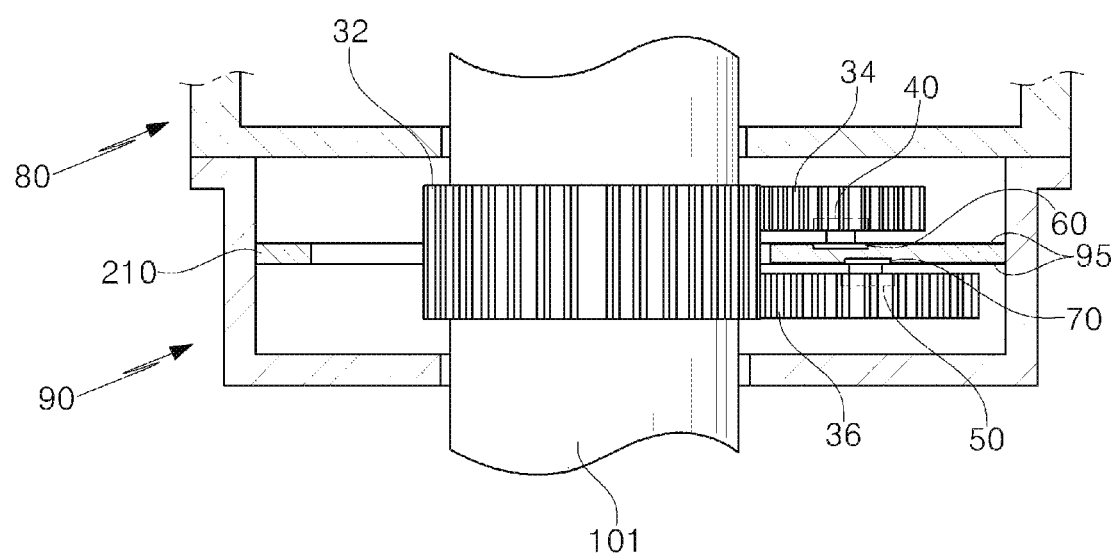
FIG. 7 is a cross-sectional view of major parts of gear module illustrated in FIG. 6.

FIG. 7 is a cross-sectional view of major parts of gear module illustrated in FIG. 6.

Referring to FIGS. 6 and 7, the second magnet (40) may be arranged at a rotational center of the first sub gear (34), and the third magnet (50) may be arranged at a rotational center of the second sub gear (36).

A second case (90) may be coupled to a lower surface of the first case (80), and the second case (90) may be opened at an upper end and may be formed at a lower end with a through hole (92) through which the output shaft (11) can pass therethrough.

The first magnet sensor (60) may be arranged at an upper surface of a PCB (Printed Circuit Board, described later) opposite the second magnet (40) fixed to a rotational center of the first sub gear (34). The first magnet sensor (60) may measure a rotational angle of the second magnet (40) and transmit a generated signal to the ECU. In addition, the second magnet sensor (70) may be arranged at a lower surface of a PCB (Printed Circuit Board, described later) opposite the third magnet (50) fixed to a rotational center of the second sub gear (36).

The foregoing second magnet sensor (70) may measure a rotational angle of the third magnet (50) and transmit a generated signal to the ECU. Thereafter, the ECU may calculate each outputted signal from the first magnet sensor (60) and the second magnet sensor (70) and as a result thereof, may calculate a rotational angle of the steering wheel. In the exemplary embodiment of the present disclosure, the rotational angle of the steering wheel calculated from the ECU is such that rotation of the second and third magnets (40, 50) arranged at the rotational center of the first and second sub gears (34, 36) meshed to the main gear (32) of the gear module (30) can be sensed by the first and second magnets (60, 70) respectively and calculated. In addition, as in the exemplary embodiment of the present disclosure, when the main gear (32) of the gear module (30) is directly meshed by the first and second sub gears (34, 36), a backlash generated from between the main gear (32), the first sub gear (34) and the second sub gear (34) can be reduced, and in response to the reduced backlash, a deviation between an actual rotational angles of the output shaft (11) and a rotational angle sensed by the first and second magnets (60, 70) can be greatly reduced.

Furthermore, the apparatus (200) according to an exemplary embodiment of the present disclosure may further include a PCB (210). The PCB (210) may take a doughnut shape having an opening, and both surfaces of the PCB (210) may be rotationally coupled by the first sub gear (34) and the second sub gear (36). Furthermore, the PCB (210) may be arranged in parallel with the main gear (32), the first sub gear (34) and the second sub gear (36), for example, and the first and second sub gears (34, 36) may be directly meshed with the main gear (32). An upper surface of the PCB (210) and a lower surface opposite the upper surface may be respectively arranged with first and second magnet sensors (60, 70).

In this case, the first magnet sensor (60) arranged at the upper surface of the PCB (210) may sense a rotational angle of the second magnet (40) and transmit the sensed rotational angle to the ECU, and the second magnet sensor (70) may sense an rotational angle of the third magnet (50) and transmit the sensed rotational angle to the ECU.

The ECU may calculate the sensed signals transmitted from the first and second magnet sensors (60, 70) to calculate the steering angle. Meantime, when both sides of the PCB (210) are arranged with first sub gear (34), the second magnet (40), and the second sub gear (36) and the third magnet (50), respective magnetic fields generated from the second and third magnets (40, 50) generate a mutual interference to cause the first and second magnet sensors (60, 70) to generate mutual interference. To prevent these mutual interferences, at least one surface in the both surface sides of the PCB (210) corresponding to the first and second sub gears (34, 36) may be arranged and/or formed with a magnetic shield film (95). Thus, the mutual interferences respectively generated from the second and third magnets (40, 50) can be prevented by the magnetic shield film (95).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A torque sensor module, comprising:
a hollowed rotor holder;
a yoke member arranged along an outer peripheral surface of the rotor holder;
a first magnet arranged along an outer peripheral surface of the yoke member; and
a support coupling portion extended to a radially external side from an upper surface of the rotor holder over a boundary line between the yoke member and the first magnet,
wherein a bottom surface of the support coupling portion is in direct physical contact with an upper surface of the yoke member and an upper surface of the first magnet, and
wherein the support coupling portion includes a plurality of unit support coupling portions spaced apart from each other in a circumferential direction.

2. The torque sensor module of claim 1, wherein the plurality of unit support coupling portions are spaced apart at a predetermined rotational angle.

3. The torque sensor module of claim 1, wherein the support coupling portion vertically fixes the yoke member and the first magnet.

4. The torque sensor module of claim 1, wherein the support coupling portion has a protruding width less than a sum of thickness of the yoke member and thickness of the first magnet.

5. The torque sensor module of claim 1, wherein the outer peripheral surface of the yoke member and an inner peripheral surface of the first magnet are of non-adhesive coupling structure.

6. The torque sensor module of claim 1, wherein the support coupling portion is melted to the upper surfaces of the yoke member and the first magnet.

7. The torque sensor module of claim 1, wherein the support coupling portion and the rotor holder are of the same material.

8. The torque sensor module of claim 1, wherein the rotor holder comprises a body, an upper support portion protruded by being extended from an upper end of the body to an outside, and a bottom support portion protruded by being extended from a bottom end of the body to an outside.

9. The torque sensor module of claim 8, wherein a diameter of the body is smaller than a diameter of the upper support portion or a diameter of the bottom support portion.

10. The torque sensor module of claim 8, wherein the outer peripheral surface of the yoke member and an inner peripheral surface of the first magnet are of non-adhesive coupling structure.

11. A steering angle sensing device, the device comprising:
a torque sensor module;
a stator discretely arranged on an outer peripheral surface of the torque sensor module and connected to an output shaft; and
a gear module including a main gear coupled to a bottom side of the stator and rotating along with the stator, and a plurality of sub gears including a second magnet and a third magnet interlocking with the main gear;
wherein the torque sensor module includes:
a hollowed rotor holder;
a yoke member arranged along an outer peripheral surface of the rotor holder;
a first magnet arranged along an outer peripheral surface of the yoke member; and
a support coupling portion extended to a radially external side from an upper surface of the rotor holder over a boundary line between the yoke member and the first magnet to contact, at a bottom surface thereof, upper surfaces of the yoke member and the first magnet; and
wherein the support coupling portion includes a plurality of unit support coupling portions each spaced apart to a circumferential direction.

12. The steering angle sensing device of claim 11, wherein the plurality of unit support coupling portions are spaced apart at a predetermined rotational angle.

13. The steering angle sensing device of claim 11, wherein the support coupling portion vertically fixes the yoke member and the first magnet.

14. The steering angle sensing device of claim 11, wherein the support coupling portion has a protruding width less than a sum of thickness of the yoke member and thickness of the first magnet.

15. The steering angle sensing device of claim 11, wherein the outer peripheral surface of the yoke member and an inner peripheral surface of the first magnet are of non-adhesive coupling structure.

16. The steering angle sensing device of claim 11, wherein the rotor holder comprises a body, an upper support portion protruded by being extended from an upper end of the body to an outside, and a bottom support portion protruded by being extended from a bottom end of the body to an outside.

17. The torque sensor module of claim 16, wherein a diameter of the body is smaller than a diameter of the upper support portion or a diameter of the bottom support portion.

18. The steering angle sensing device of claim 11, wherein the plurality of sub gears include a first sub gear and a second sub gear each meshed to sets of teeth at the main gear, and a rotational center of the first sub gear and the second sub gear are respectively arranged with the second magnet and the third magnet.

19. The steering angle sensing device of claim 18 further comprising a first magnet sensor arranged on a PCB (Printed Circuit Board) facing the second magnet.

20. A motor-operated steering device, the device comprising:

a steering angle sensing device; and an electronic controller driving a motor in response to an operation condition detected by the steering angle sensing device, wherein the steering angle sensing device includes:

a torque sensor module;

a stator discretely arranged on an outer peripheral surface of the torque sensor module and connected to an output shaft; and a gear module including a main gear coupled to a bottom side of the stator and rotating along with the stator, and a plurality of sub gears including a second magnet and a third magnet interlocking with the main gear, and wherein the torque sensor module includes:

a hollowed rotor holder;

a yoke member arranged along an outer peripheral surface of the rotor holder;

a first magnet arranged along an outer peripheral surface of the yoke member; and a support coupling portion extended to a radially external side from an upper surface of the rotor holder over a boundary line between the yoke member and the first magnet to contact, at a bottom surface thereof, upper surfaces of the yoke member and the first magnet; and wherein the support coupling portion includes a plurality of unit support coupling portions each spaced apart to a circumferential direction.

* * * * *